(No Model.)

J. H. HARTMAN.
NUT LOCK.

No. 587,962. Patented Aug. 10, 1897.

WITNESSES:
Donn Twitchell
Fred Acker

INVENTOR
J. H. Hartman
BY
ATTORNEYS.

THE NORRIS PETERS CO., PHOTO-LITHO., WASHINGTON, D. C.

UNITED STATES PATENT OFFICE.

JOHN HENRY HARTMAN, OF GERMANTOWN, NEW YORK, ASSIGNOR TO FRANK FISHER, OF SAME PLACE.

NUT-LOCK.

SPECIFICATION forming part of Letters Patent No. 587,962, dated August 10, 1897.

Application filed July 22, 1896. Serial No. 600,138. (No model.)

*To all whom it may concern:*

Be it known that I, JOHN HENRY HARTMAN, of Germantown, in the county of Columbia and State of New York, have invented new and useful Improvements in Nut-Locks, of which the following is a full, clear, and exact description.

The object of the invention is to provide a nut-lock of simple, durable, and economic construction and so made that the nut will be provided with a yoke readily adapted thereto and so connected with the bolt and with the nut that both will be prevented from turning.

A further object of this invention is to construct a nut-lock which is particularly adapted for use on railroads in connection with the rails, fish-plates, and the like.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the views.

Figure 1:
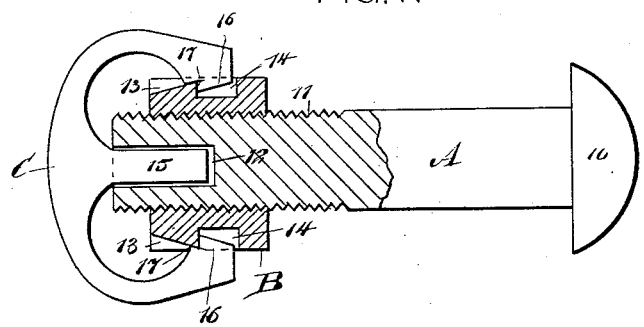
Figure 2:
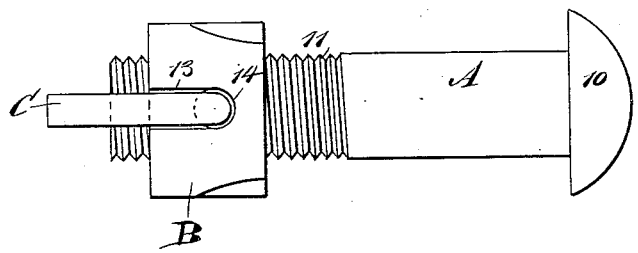
Figure 3:
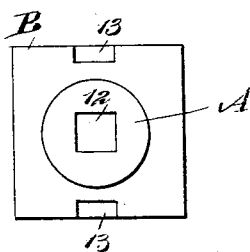

Figure 1 is a side elevation and a partial sectional view of a bolt, a vertical section through the nut, and a side elevation of the yoke employed for holding the nut and the bolt in a given position. Fig. 2 is a plan view of the bolt, the nut, and the yoke; and Fig. 3 is an end view of the bolt and the nut applied to the same.

In carrying out the invention the bolt A is provided with the usual head 10 and exterior thread 11, but in the threaded end of the bolt a longitudinal bore or recess 12 is produced, the said bore or recess being polygonal in cross-section. Usually, however, it is square. The nut B used in connection with the bolt is screwed thereon in the usual manner, but in opposite sides of the outer face of the said nut guideways 13 are made, the base-walls whereof are inclined in opposite directions, and these guideways connect with recesses 14, which may be circular in general contour or which may be of other shape.

In connection with both the bolt and the nut a yoke C is employed. This yoke has a central tongue 15, which is of corresponding cross-sectional shape to the opening 12 in the nut, which opening the tongue 15 is adapted to enter. The terminal portions of the yoke C are curved inwardly or in direction of each other, and each terminal is provided with a head 16 of less width than the terminal proper, thereby providing a shoulder 17, which is preferably located at the outer end of each head. In fact the outer end of each head virtually constitutes the shoulder. The inner side faces of the heads 16 of the yoke are inclined in a corresponding manner to the inclination of the base-walls of the guideways 13 in the nut, and the recesses 14 are of sufficient size to just receive the heads of the yoke, as shown in Fig. 1.

In the operation of the device the nut is screwed on the bolt as far as desired. The yoke is then placed in position by entering the tongue 15 into the opening 12 in the bolt and sliding the head portions of the yoke along the inclined walls of the guideways 13 until the said heads shall have entered the recesses 14. When this is accomplished, it is evident that the nut cannot turn on the bolt or the bolt turn in the nut.

Having thus described my invention, I claim as new and desire to secure by Letters Patent—

In a nut-lock, a bolt, the threaded end of which is provided with a recess having angular walls, a nut screwing on the threaded end of the bolt and having a recess in one side, the nut also having a guideway leading upwardly and inwardly from the recess, and a yoke having two arms one of which is angular and fitted within the recess in the bolt and the second of which is provided with an inclined face terminating at its upper end in a shoulder, the yoke being adapted to be moved downward so that the arm with the inclined face will ride along the guideway and spring into the recess of the nut and so that the shoulder will bind against the upper wall of the recess in the nut, substantially as described.

JOHN HENRY HARTMAN.

Witnesses:
 JESSIE R. DE WITT,
 LOUISE M. DE WITT.